Figure 1:
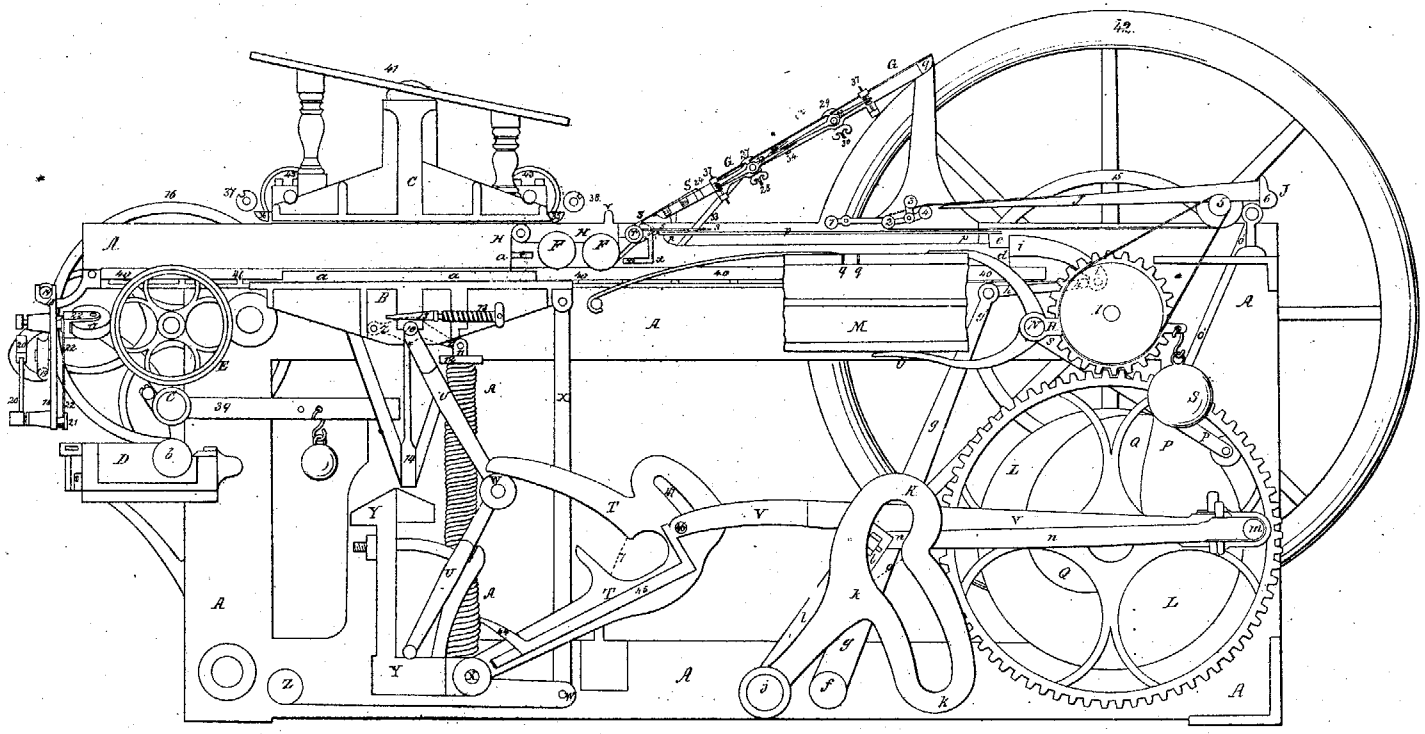

9445X

I. Adams.

Printing Press.

№ Patented Mar. 2. 1836

Extended for seven years from 2nd March 1850

Isaac Adams of Boston Massachusetts
Letters Patent

The Schedule referred to in these Letters Patent and making part of the same containing a description in the words of the said Isaac Adams himself of his improvement in the Power Printing Press To all to whom these presents may come, Be it known that I, Isaac Adams Machinist of Boston in the County of Suffolk and State of Massachusetts, have invented a new and useful improvement in the Power Printing Machine, and the following is a full and true Specification thereof. Drawing No 1, is an elevation of the machine the front side of the frame being removed in order to show the interior and operating parts AAAAAA is the opposite side of the frame, B is a Section of the bed. a a the form of type C. is a Section of the Platten. D is a Section of the ink fountain. b the fountain Roller. c. is a composition feed Roller that conveys the ink from the fountain roller to the cylinder (E) upon which it is distributed. F.F. are the rollers which distribute the Ink on the type. They are suspended in the slide frame (d, d, d) on pivots in the usual way e e are sections of two cross bars which connect the two side pieces of the slide frame together. This frame is the carriage for the Rollers, F.F. and the nippers S, r. and the frisket r r r. it runs in [illegible] grooved railways, no. no. no. no. no. and motion is given to it in the following manner, f is a section of a rocker shaft which rests in bearings on the sides of the frame, and has an arm or lever at each end as, g g g. these arms are connected to the sliding frame by means of pitmans (h h). in the manner shown at h h i. (J) is another rocker shaft on which is what I have named an alternator. k, k, k The arm (ll) also proceeds from this shaft and motion is communicated to it and the alternator from the crank m. by means of the pitman n. n. The alternator moves the arms and consequently the slide frame, by means of a roller which projects from the inner side /m.

of the arm on the rear end of the shaft f. into a crooked opening crosswise in the upper part of the alternator. (As the machine is now situated the roller last named would be in the upper part of the opening in the alternator, now it is quite evident that when the alternator begins to move the roller together with the arms (q) and all attached to them will be moved by it, and the Roller will descend in the opening until it arrives at O. where the opening begins to be on a circle with the shaft (J.) at this moment the Slide frame will have arrived at the place where it must rest until the impression is given. the alternator however continues to move on but the remaining part of the opening being on a circle with the shaft it merely keeps the roller and all attached to it from moving while the impression is being given. A completion of the revolution of the crank m. will of course bring the alternator, and consequently the carriage or slide frame back to where they now are. Thus, by the means of the crank m. and the alternator the necessary reciprocating periodical movement is obtained for the press above described. G.G. is a stationary tympan upon which the sheets to be printed are to be laid and pointed. The tympan is hung on pivots at q. to two standards, one arising from each side of the frame. After a sheet has been printed it is taken from the tympan, and carried in between the bed and the platten by nippers on the Rod r. which extends across from one side to the other of the slide frame. S, S, S, S, t. is a section of the two parts of the nippers as they appear when open at the moment before they close to seize the sheet. The two parts (S S S S) of the nippers are made of thin plates of ~~thin plates~~ of steel about four inches wide and are fastened to other pieces of steel on the rod r. which are put together in the manner of the joint of a hinge on the pin that holds it together on the pieces that the under lips of the nippers are fastened to an projection (t) forming a sort of hitch. The nippers are continually drawn together by means of spiral springs, wound around the rod r. one end of each being attached to the rod and the other to the under half of the nippers. At one end of the rod ( r ) is a
piece projecting at a right angle, from it, about two and a half
inches long on the outside of this projection, near to its end is,
a small roller which runs in a groove formed on the side of the
frame for the purpose of operating the nippers. The manner of
their operation is as follows. Suppose the machine to be in mo-
tion and the nippers, (after an impression has been given ) to be just
emerging from under the platten, at this moment the roller on the
end of the rod r: enters the before named groove, which being
crooked forces the roller downwards and causes the rod r, to
turn. Now the upper half of the nippers being so fixed to
the rod that they cannot turn on it, will be elevated as they ad-
vance towards the tympan high enough to be sure to come on over
the edge of the sheet of paper as it lays on the tympan. When
they get near to the tympan they are made to descend by an op-
posite bend or crook in the groove above named untill they
come down hard on the sheet and the edge of the tympan —
which secures the sheet from moving from its place untill the
under halfs of the nippers are brought up. each end of the rod, r.
will at this moment have struck against projections on the frame and
stoped but the slide frame continues to move on until the catches
t are disengaged which allows the under part of the nippers to
be drawn up by the spiral springs against the upper parts. thus the
sheet is seized by the nippers. H, H, is one of the two small cylinders
one of which is secured by a pin through its end to each side of
the slide frame within these cylinders are spiral springs and
in their ends are pistons or slides (u) which are kept out by
the springs. they enter the slots in which the rod r. is placed and
press it firmly against their opposite parts, so when the rod is
stopped by the projection as above named the pistons will be pres-
sed into the cylinders and when the slide frame moves back the
rod will be forced back into its place by the expansion of
the springs. when it is necessary to take out the rod and nippers. the slides (u) may be drawn back by pressing against the
studs V. which proceed from them. the cylinders can then be rai
sed up and the rod and nippers removed. W is a section of a ba
that is hung in the slide frame n pivots at x. the use of it is to
prevent the under part of the nippers from rising up when the
upper part does. . . . Now the sheet having been seized by the
nippers as described above. The points are made to drop below
the surface of the tympan. . . . and the slide frame begins to mov
towards the platten in order to carry the sheet on over the type,
as it moves along the before named groove, operates on the roller on
the end of the rod r. and causes the nippers gradually to descend
until they come to a horizontal position, at which position they
are brought about the time they enter under the edge of the platten
The sheet as it is drawn from the tympan falls on to the [illegible]
et. 1. 2. 3. 4. are rollers which extends from side to side of the
machine. and there are six or eight tape bands ( the number of ba
requisite depends on the size of the press ) that run on and con
nect the rollers 1. & 3. and also eight more bands which runs on
the Rollers 2. & 4 and on to pulleys on the shaft 5. these
are all carried by means of a band from a pulley (I) on the fly whee
shaft. J J. is a section of a fly frame. constructed in the man
ner shewn in the drawing. No 2. The fingers. JJJJJJJJJJ are
covered with thin cloth in pairs, except the two outer ones. and
when they lay horizontally come between the bands and pul-
leys named above. the fly is hung to the front side of the
machine by the shaft k k and is operated in the follow
ing manner viz m. in drawing No 2. is a small toothed [illegible]
on the shaft k k. and n. is a rack on the end of a rod
O. which goes into it. this rack is connected at its further en
d to a lever O. O. (Drawing No 1.) by a steel [illegible] on the lo
end of the lever is a roller P. which is operated on by a cam
on the side of the wheel T. T. Now when the machine is in
operation the cam operates the lever O O which moves the Y.C. (Drawing No 2) which by means of the toothed wheel m. brings
the fly down to a horizontal position as shewn in the drawing where
~~[illegible]~~ it is held a short space of time until a quick turn or falling
off in the camb leaves the lever (C.O) free. upon which a spiral
spring (P. drawing No 2.) on the shaft K.K. causes it to turn and
carry the fly over on to the table that stands near by for the purpose
A continued movement of the camb. will turn the fly back, and so
on alternately. M is a section of a bellows which extends from side
to side of the machine nearly but not quite. q.q. are two openings
which extends the whole length of the bellows. The Bellows is opera
ted as follows. N is a shaft sustained in bearings on the sides
of the machine. O.C. is one of two levers, or arms, which extend
out from the shaft under the Bellows. P.P. is a lever on the same
shaft with a Roller at its end that is operated on by the camb Q
Q. This Roller should now be in contact with the camb. but
I have drawn it in its present position in order to allow the Bel
lows to be represented open. R is another arm extending from
the same shaft with the weight (S) suspended from its end.
when the machine is in operation the camb operates on the
Roller on the end of the lever P.P. and raises the weight S and
throws down the arm C.C. which allows the bellows to open but
when the highest part of the camb passes the roller the weight throws
up the arms C.O. and closes the Bellows and forces the wind out
through the opening q.q. The object of the Rollers, pulleys, tapes,
Bands. and Bellows just described is to take the sheets of paper
from the frisket after they have been printed, and lay them on a
table prepared for the purpose. after a sheet has received an
impression it is carried from under the platten on the frisket and
passes along under the Tympan and Rollers 1. 3 at the moment
the [illegible] of the frisket has been carried as far as the Roller 1. the
highest part of the camb Q will pass the roller on the lever P.
P. which allows the weight S to operate the bellows and blow
the air swiftly through the openings q.q. The current of air thus obtained strikes the under side of the sheet and carries its edge
up against the tapes on the Rollers 1. 3. The Rollers and Tapes be
ing in motion. and the sheet also continuing to advance with the
frisket. the edge of the sheet is quickly brought between the roller
2. and the tapes on the Rollers 1. 3. The sheet thus seized con
tinues to be carried along on the tapes that runs over the Rollers 2 &
11. and the pulleys on the shaft 5. until its edge strikes the
upper edge of the main bar (6). or back bone of the fly. which
takes place about the time that the most prominent part of the
cam on the wheel L passes the roller on the lever O. O. which
allows the spiral spring on the shaft K K to throw the fly o
and lay the sheet on the table above named. The Bed is raised
and the impression given in the following manner. T T is an
alternator similar in principle to that described for giving motion
to the frisket frame U U are the togle joints W. is a roller
placed in a space for the purpose in the middle of the togle joints, an
on the pin in their centre joint. The alternator is made to operate
the togle joints by means of the crank and pitman V V m.
Now suppose the machine to be situated as shown in the draw
ing. When it begins to move, the crank pin (m) on the cog
wheel, will move in a downward direction. this by means of the
two pitmans will carry the two alternators forward K K. will car
ry the arms g g. along until the frisket is brought to the place
where the impression must be given. but a little before the
frisket has stopped the point y. on the alternator T'T' will
have come in contact with the Roller W. it may now be pe
ceived that this part of the alternator forms an inclined plan
in the side of a lever of the second class X being the fulcrum
and that as it continues to advance the Roller W. will roll
up on the inclined plain until the alternator has received [illegible]
of its motion in that direction at which time the togle joints will
have been forced up nearly to a perpendicular line which carries
the type up firmly against the paper and platten and produ the impression. A completion of a revolution of the crank and
cog wheel. will of course bring all the parts to where they now are.
Y Y is a section of what I term the bottom bar. it sustains the
impression. and is connected to the platten by a two inch round
bolt at each end. Z is a rocker shaft suspended in bearings
to the two sides of the machine, it has two arms extending from
it to W. from the end of each of these arms arises a rod X.
and connects with the bed; on each of these arms, is placed a
spiral spring (A A to assist in raising the bed. 2 2. is one of two
levers that the pin 10 passes through, to connect the toggle joints
to the bed. these levers are connected at 11. to a bar 12. that rest
on the spiral springs A A. 13.13. are sections of a wedge and
screw. by means of which the impression is increased or dimin
ished. The Bed is kept steady in rising and falling by means
of a guide (14) at each end of the bed which runs in grooves on
the inner sides of the frame. and also by the two rods X which
keep it from Canting endwise. The ink is distributed in the
usual way viz by Rolling together the Rollers and cylinders.
The cylinder is carried by a band from a pulley on the fly wheel
shaft to a pulley (16) on the shaft of the cylinder 17. 17. is
a swivel roller which distributes the ink laterally on the
cylinder, it is connected to a small frame or carriage
18.18. which runs in rods 19.19. it is made to travel by being
placed obliquely against the cylinder. 20. 20 is a weight and
lever connected to the swivel spindle 21. This spindle has
a cross piece on its end from one end of which arises the
rod (22) and connects with the little frame 23. which
the Roller runs in. This last named frame is connected to
the carriage (18 18) by a spindle. Now when the Roller
has arrived at one end of the cylinder a projection from
the lower part of the scroll which sustains the rods 19.19. comes
in contact with the lever 20 (and the Roller continuing to advance turns
it in the opposite direction. this by means of the little connecting Rod (2.2) reverses the obliquety of the Roller which causes it to commence its
[illegible] the other way. and so on alternately. The fountain is construct-
ed in the usual way excepting that the quantity of ink is regulated
by means of a rod that runs the whole length of the fountain, and is
made wedging at each end, the pieces which forms the bearings for
the fountain Roller: bear against those parts of the Rod which are
wedging. so that moving the Rod one way or the other enlarges or lessens
the space between the Roller and scraper. for the ink to pass through. the
wedge is moved by means of a screw which screws. into a little stud on the
rod. and is attached to a similar stud on the fountain. Another way
I have is to use a round rod made eccentric at each end where the pie
ces forming the bearings of the fountain Roller come against it. This rod
is placed in form bearings on the side of the fountain. and holes are
made through one end of it so that by means of a small lever it may be
moved on its axis. which has the same effect as moving the edge endwise
The pivots or gudgeons of the Rollers which distribute the ink over the
the type are put into smooth holes in the ends of the Rollers and are
kept out by means of springs put inside of the Rollers X the object of this
is that the gudgeons may be pressed into the body of the Rollers, and con-
sequently be drawn out of the holes, that form their bearings so that the
rollers may be handyly removed from their places without having moveable
caps over their bearings; another way to construct the nippers is, shown
at figures, 1 & 2, drawing No 2. a. a. a Fig 1 is a frame suspended to the
frisket frame by the pivots b. b. to this is fixed another frame c. c. d
the ends c. c. of which are fitted in grooves. in the ends of the fram
a. a. a. The frame c c d. is kept out in its present place by a
spring e. e Fig 2. is a section of the frames above named with
or with the nippers f. The nippers are secured to the side (d Fig 1.) of
the frame c c d. by means of screws g Fig 2. The nippers are closed
by means of the Rod h. in the following manner. The Rod is secur
to the frame d. by means of pins or screws (k) which pass through
slots made in a diagonal direction through it, and its end i is fit
ted to the end piece of the frame a. a. a. in the manner of a mit Now first before the upper parts of the nippers are brought on the edge
of the sheet of paper and tympan as described of the nippers before nam
ed. the lower part of the frame c.c. d is brought against projections on the
sides of the machine which stop it, but the outer frame a a a
continues to move, consequently its end piece at i is made to operate
in the manner of a wedge against the end of the Rod le which slips
along on the frame d and (the slots being diagonal as above named
rises up also, and closes the nippers on to the sheet. When the sheet
has been carried nearly to the place where it is to receive the impression
as above described, the end of the Rod le; is brought against an in
clined plane which presses it back and leave the nippers free to open
again A is a roller on the frame a a a by means of which the nippers
are operated in the manner described of the first named nippers.
The tympan is a frame of wood covered with sheet iron on its up-
per side as far down as 24. 25. & 26. are two small holes made in
the end piece, at the further end of the tympan, these are for the pur
pose of receiving the end of the Rod. which it is necessary to put
across from end to end of the tympan. when the paper is broad in
order to keep its edge from bending down. The near end of the rod
is kept in its place by passing a pin through the end piece of the tympan
into a hole drilled for that purpose in the end of the Rod. The pin is made
so as to be easily drawn out with the fingers. so that the rod may be
quickly shifted from one place to the other. The pieces on the tympan that
are colored yellow in the drawing are secured in their places by mean
of the little bolts and nuts 27. 28. 29. 30. points 31. 31. are put
through little projections, on their ends and are caused to project beyond
the face of the tympan... and to fall back (so as to allow the sheet
to be drawn off) by means of the little levers 32. 32. The ends of
these levers come together and are attached to the end of another lever
33. 33. at the centre of the tympan 34. This last named lever runs
diagonally from the centre of the tympan about seven or eight inches
it then turns and runs in a direction crosswise of the machine
until it reaches the further part of the tympan. it then runs at rig angles in the direction 33. 33. it is operated as follows. On the slide
frame is a little camb. so situated that when the slide frame moves, along
the camb comes under the end of the lever and raises it up, which
thrusts the points out as they are shewn in the drawing. and on the side
of the machine is fixed a spring, that will when the end of the
lever is raised as above named spring out under it and hold it up.
Now when the time comes for the points to be drawn in, another little
camb on the side of the slide frame presses off the spring and disengage
the lever, which will then by its own weight drop down, and draw in
the points. It is sometimes necessary that the points should be placed
so as to range with each other lengthwise of the sheet and some time
crosswise. It is therefore necessary that the points should be so fix[ed]
that their situation may be easily changed, for this purpose there
are two circular slots cut in the face of the tympan, the common
centre of which is the screw or pin which connects the two levers that
operate the points to the end of the lever 33. 38. The bolts 27. 29.
are put through these slots so that by loosening the nuts on them
the pieces to which the points are attached may be moved round and
secured at any point that may be requisite (in getting register). The upper half of the
nippers are a little longer than the lower halfs. So that their ends
may reach on to the edge of the tympan (or the rod before named to
confine the sheet before the under half fly up. There must be a num
ber of pairs of nippers of nippers of different lengths on account of the
forms of type being of various widths. 35. & 36. are sections of the
two side rails of the parchment tympan frame, this is secured by two slide
bolts on the platten near 36. — 37. 38 are rollers to which the tympan
sheet is secured. a long sheet is procured for this purpose (it may
be made by pasting common sheets together) and Rolled up on one
of the Rollers. its end is then passed under the platten. and secu
red to the other Roller, which is turned until the sheet is drawn
smooth under the face of the platten. both Rollers are then secured
from turning by palls being dropped into a ratchet wheel on the
end of each Roller. The ends of the sheet are secured to these Rollers by putting them into grooves, along the side of the Rollers, and then pressing
a rod into the groove on the paper. One or both of these Rollers should
be hung on Springs so as to continually draw on the paper to
take up whatever it may stretch. Now it is plain that when
one place on the sheet, has been soiled by turning the Rollers, a clear
place may be drawn on instead of it. The fountain Roller is turn-
ed in the usual way by means of a pall and a ratchet wheel.
The pall is attached to one of the levers (39) which sustains the
feed Roller (C). 41. is the table upon which the heap of Paper
to be printed is placed. 42. is the fly wheel. 43. 43. are rollers
which sustains the platten, these rest on Railways formed by
the top edges of the frame. When a form is to be put on to the Bed
the tympan and the frame and Rollers 1.2.3.4. are turned up
and fastened by a Catch, the platten may then be moved off from
over the bed. the frisket and nippers taken out, and the form
put on in the usual way. 44. 45. is a slide attached to the
side of the alternator, for the purpose of raising the pitman so that
the pin 46. may go into the aperture 47. in order to prevent an
impression. This is effected by a lever one end of which is placed
under the curved part (44) of the slide, and the other end in a
convenient place for the person who prints to put the foot on when
an impression is to be prevented. The levers to which the feed roller
is suspended are operated by means of projections on the guides,
(11) of the bed. The cylinder for the distribution of the ink may be made
of wood or metal. The best way I think is to make it of metal, and
and make it hollow and light so as to be capable of holding water
or steam. Then through a hole in the end (that may be stopped
with a cock, a plug or valve) there may be hot water introduced
in cold weather, or cold water in hot weather, in order to regulate
the temperature of the ink and rollers, or there may be a hole in the
shaft of the cylinder and a pipe adapted to it through which steam
~~steam~~ may be introduced for the same purpose. An economical way
of drying the paper after it has been printed on the second side is to connect a drying cylinder to the end of the machine at which the paper is taken off. Drying cylinders are constructed in a similar ~~or a similar~~ manner to the metallic cylinder above described for the distribution of the ink only they are made considerably larger and have a cloth (made into a band by sewing the ends together) which runs on Rollers and against the side of the cylinder so that the paper may enter between the cylinder and cloth band on one side, and come out dried at the other. The cylinders being continually heated by means of steam. or water as above named or otherwise. In order to dry the paper as it comes from the press with an apparatus of this sort, the fly frame for throwing off the paper may be removed. and the cylinder and cloth band placed so near to the pullies on the shaft 3. that as the sheets are carried along over the Rollers 2. 4. and the tape bands as above described they will be received on the cloth band and be carried between it and the cylinder and be brought out at the opposite side dried. where they may be taken and disposed of by a person for the purpose. The groove on the side of the machine described above for the operation of the nippers arm instead of being made stationary be made in the end of a lever attached to the side of the frame, which may be operated by a cam on the fly wheel [illegible] This I believe to be the best way when accurate register is required [illegible] by it the upper parts of the nippers may be brought down on the sheet after the nippers has stopped. in this way the sheet is less liable to be displaced before it is fastened on by the nippers) I claim the combination with printing presses of the alternators above described for the purposes above set forth. I claim the combination with printing presses, of the apparatus above described for putting on securing and changing the tympan sheet. I claim the combination with printing presses, of nippers constructed on the principle of those above described for taking the paper from the tympan; I claim the combination of nippers for seizing holding and drawing the paper into the press with printing presses in which vibrating arms, or levers are used to move the Rollers over the type or to move the frisket or to move [illegible]

I claim the combination of the nippers with the slide frame instead of with
the friskets. I claim the combination above described of those parts which
are essential to the perfect operation of the nippers. I claim the combination
of nippers for drawing the paper into the press as above described with print
ing presses in which the ink is distributed on [the] rollers that distribute it
over the types, by means of cylinders or Rollers instead of tables or plane
surfaces. I claim the combination of wedges and also of eccentrics with
the ink fountain for altering the space between the roller and scraper.
I claim the combination above described of those parts which constitute the
stationary tympan and the various parts connected with it which are essen
tial to the operation of the points and to facilitate the taking of the sheet
by the nippers. I claim the combination of vibrating arms or levers for
moving the Rollers over the forms, for moving the frisket, or for moving both
Rollers and frisket, with printing presses in which a crank is used to
operate the toggle joints which produce the impression. I claim the combina
tion of stationary points (that is points which never come between the bed
and platten) with printing [presses] in which vibrating arms or levers which move
vertically are used for moving the Rollers that pass over the types, for moving
the frisket or for moving them both. I claim the combination of a crank
which moves vertically to operate the toggle joints which produce the
impression with printing presses in which the Rollers are passed between
the bed and platten to ink the types. I claim the combination of the wedge
for altering the impression with the bed instead of the bottom bar. Pneumat
ic apparatus of various kinds may be used for raising the sheets from the frisket
as above described, as for instance the Bellows the air pump or the vibra-
ting or revolving fans, and these may be used to raise the sheet by drawing
air into holes just over the sheet of paper, or they be used as above descri
bed, to force the sheet up by ~~forcing~~ producing a current of air against
the under side. I claim the combination of the Pneumatic apparatus
with printing presses for raising the sheet of paper from the frisket. I
claim the combination of Rollers as above described, and bands, and
pulleys with printing presses for removing the sheet from the frisket.
I claim the combination of the fly frame with the Rollers and with the

9445X 3-2-1836

282.

pulleys and with the bands as above specified for the purpose of conveying the sheets after they have received an impression to a table or other conveni-ence. I claim the mode or manner of constructing the tympan and the frisket connected with the points for the more easily changing the points and getting Register. I claim the combination of ink Rollers which have moveable gudg-eons and springs as described above with printing presses. The rollers refered to in this claim are those that distribute the ink over the types. I claim the combination of drying cylinders with printing presses for the purpose of drying the paper after it has been printed as above set forth. I claim the combination of metallic distributing cylinder as above named with printing presses. this last claim is confined exclu-sively to the cylinder which transmits the ink to the Rollers that pass over the type and also distributes it on them. I will also name that this claim does not refer to fountain Rollers. There may be two small cylinders instead of the one marked E in drawing No 1. The claim last above written the nippers is not to extend to cylinder printing machines. The above is a true specification of my said invention, [illegible] I have made some mistake or forgot something.

Exd. Witnesses
WC H. O. Walts
James W. Jenner

Isaac Adams (6244 words)

Claim alone 858 [illegible]

(Granted March 2. 1836.)

[illegible]